UNITED STATES PATENT OFFICE.

HEINRICH WULKAN, OF SLANJE, AUSTRIA-HUNGARY.

PROCESS OF OBTAINING STARCH AND ZEIN.

SPECIFICATION forming part of Letters Patent No. 696,156, dated March 25, 1902.

Application filed September 1, 1900. Serial No. 28,809. (No specimens.)

*To all whom it may concern:*

Be it known that I, HEINRICH WULKAN, a subject of the Emperor of Austria-Hungary, residing at Slanje, near Ludbreg, Croatia, Austria-Hungary, have invented certain new and useful Improvements in a Process of Obtaining Starch and Zein from Maize or Indian Corn, of which the following is a specification.

To carry this process into effect, I subject cornmeal or finely-broken grains of corn from which the germs, skin, and impurities have been removed to the action of a strong aqueous solution of alcohol containing some alkali, preferably by stirring them together, so as to give them a circular motion and mix them thoroughly. While this proceeds, the alcohol dissolves a part of the zein, and the alkali dissolves the remainder. The liquid mixture thus produced is poured off from the residual starch, which is washed and dried. The alcohol of the previously-separated alcoholic albuminous solution is then distilled off *in vacuo*, as distillation with access of the atmosphere would cause the zein to be decomposed. The alkali meanwhile keeps the zein in solution. Dilute acid is then applied to neutralize the alkali and precipitate the zein. Any fat or coloring-matter mixed with it may then be washed out with benzene, leaving the zein quite pure.

Thus by a very simple process both pure starch and pure zein are produced with no appreciable loss.

When starch-syrup or starch-sugar is to be obtained, the germs and shells are not removed in the first preparation of the comminuted corn. The starch produced as before described is converted into sugar by means of acids, and the resulting liquid is neutralized by carbonate of lime clarified and rendered colorless by the aid of bone-black, after which it is inspissated to the consistency of syrup or allowed to crystallize into solid sugar.

The process described in this specification may be applied to wheat, rice, and other grains and fruits.

Having thus described my invention, what I claim as new, and desire to secure by Letters Patent, is—

A process for obtaining starch and zein consisting in the following steps; first, mixing comminuted corn with a solution containing alcohol and alkali; secondly, separating this alcoholic liquid from the corn; thirdly, distilling off the alcohol from the said liquid, leaving a liquid from which zein may be precipitated, and finally neutralizing the alkali of said liquid with dilute acid to precipitate the zein, substantially as set forth.

In witness whereof I have hereunto set my hand in presence of two witnesses.

HEINRICH WULKAN.

Witnesses:
   HANS SANNENHEIM,
   ALVESTO S. HOGUE.